(12) United States Patent
Felkey et al.

(10) Patent No.: US 9,002,734 B2
(45) Date of Patent: Apr. 7, 2015

(54) METHOD AND SYSTEM FOR PROCURING TELECOMMUNICATIONS SERVICES ON-LINE

(75) Inventors: Mark A. Felkey, Colorado Springs, CO (US); Tyler J. West, Atlanta, GA (US); Susan O. Diemer, Reston, VA (US); Michael E. Marcellin, Ashburn, VA (US); Diane L. Sabatini, McLean, VA (US); Elaine S. Mason, Stone Mountain, GA (US); David K. Braverman, Alpharetta, GA (US); Patricia A. Boyer, Fairfax Station, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1172 days.

(21) Appl. No.: 10/051,282

(22) Filed: Jan. 22, 2002

(65) Prior Publication Data
US 2002/0161667 A1    Oct. 31, 2002

Related U.S. Application Data

(60) Provisional application No. 60/263,222, filed on Jan. 23, 2001.

(51) Int. Cl.
*G06Q 30/00* (2012.01)
*H04M 15/00* (2006.01)
(Continued)

(52) U.S. Cl.
CPC ........... *H04M 15/745* (2013.01); *G06Q 10/087* (2013.01); *G06Q 30/02* (2013.01); *G06Q 30/06* (2013.01); *G06Q 30/0601* (2013.01); *G06Q 30/0613* (2013.01); *G06Q 30/0625* (2013.01); *G06Q 30/0633* (2013.01); *G06Q 30/0641* (2013.01); *H04L 29/06* (2013.01); *H04M 3/493* (2013.01); *H04M 3/5191* (2013.01); *H04M 15/00* (2013.01); *H04M 15/46* (2013.01);
(Continued)

(58) Field of Classification Search
USPC ..................... 705/26, 27; 379/201.03, 201.02
See application file for complete search history.

(56) References Cited

U.S. PATENT DOCUMENTS 5,619,558 A    4/1997   Jheeta
5,960,411 A    9/1999   Hartman et al.
(Continued)

OTHER PUBLICATIONS

Definition of PLMN; Newton's Telecom Dictionary, 1998, p. 554.*
(Continued)

*Primary Examiner* — Paul Danneman

(57) ABSTRACT

A method and system for procuring and servicing telecommunications offerings, including a customer browser loaded on a customer client computer, a back office browser loaded on a back office client computer, and a server program loaded on a server computer. The customer browser is configured to submit a procurement inquiry, the procurement inquiry specifying a selected telecommunications offering from among voice, Internet and mobile telecommunications offerings. The back office browser is configured to submit a service inquiry, the service inquiry specifying a search criteria with respect to an order for a telecommunications offering, a customer agent assigned for servicing a telecommunications offering order, and a move, change or disconnection (MCD) of a telecommunications offering order. The server program is configured to receive the procurement and service inquiries, generate procurement data pertaining the to the selected telecommunications offering and service data pertaining to the search criteria, and transmit the procurement and service data.

17 Claims, 10 Drawing Sheets

(51) Int. Cl.
*G06Q 10/08* (2012.01)
*G06Q 30/02* (2012.01)
*G06Q 30/06* (2012.01)
*H04L 29/06* (2006.01)
*H04M 3/493* (2006.01)
*H04M 3/51* (2006.01)
*H04L 29/08* (2006.01)

(52) U.S. Cl.
CPC .............. *H04M15/49* (2013.01); *H04M 15/51* (2013.01); *H04M 15/805* (2013.01); *H04L 67/16* (2013.01); *H04L 67/36* (2013.01); *H04L 67/02* (2013.01); *H04L 69/329* (2013.01); *H04M 2201/42* (2013.01); *H04M 2215/0108* (2013.01); *H04M 2215/0176* (2013.01); *H04M 2215/46* (2013.01); *H04M 2215/54* (2013.01); *H04M 2215/56* (2013.01); *H04M 2215/7457* (2013.01); *H04L 67/42* (2013.01)

(56) References Cited

U.S. PATENT DOCUMENTS

| | | | | |
|---|---|---|---|---|
| 6,041,104 | A | * | 3/2000 | Lipton et al. ............... 379/67.1 |
| 6,085,171 | A | * | 7/2000 | Leonard .................. 705/26.35 |
| 6,098,108 | A | * | 8/2000 | Sridhar et al. ............. 709/239 |
| 6,104,999 | A | * | 8/2000 | Gilles et al. ................... 705/1 |
| 6,463,420 | B1 | * | 10/2002 | Guidice et al. ............... 705/28 |
| 6,788,949 | B1 | * | 9/2004 | Bansal ...................... 455/519 |
| 6,853,714 | B2 | * | 2/2005 | Liljestrand et al. ...... 379/201.03 |
| 6,965,868 | B1 | * | 11/2005 | Bednarek ...................... 705/9 |
| 7,069,234 | B1 | * | 6/2006 | Cornelius et al. ............ 705/80 |
| 2001/0054064 | A1 | * | 12/2001 | Kannan ..................... 709/203 |

OTHER PUBLICATIONS

U.S. Appl. No. 10/051,182, filed Jan. 2002, Felkey et al.
U.S. Appl. No. 10/051,180, filed Jan. 2002, Felkey et al.

* cited by examiner

METHOD AND SYSTEM FOR PROCURING TELECOMMUNICATIONS SERVICES ON-LINE

CROSS REFERENCE TO RELATED CASES

The present invention claims the benefit of priority under 35 U.S.C. §119(e) to U.S. Provisional Patent Application No. 60/263,222 of Diemer et al., entitled "ON-LINE SERVICING SYSTEM," filed on Jan. 23, 2001 and is related to the following commonly owned United States Patent Applications to Felkey et al., filed herewith, entitled: (1) "GRAPHICAL USER INTERFACE FOR PROCURING TELECOMMUNICATIONS SERVICES ON-LINE," Ser. No. 10/051,182, and (2) "METHOD AND SYSTEM FOR PROVIDING SOFTWARE INTEGRATION FOR A TELECOMMUNICATIONS SERVICES ON-LINE PROCUREMENT SYSTEM," Ser. No. 10/051,180, the entire contents of all of which are incorporated herein by reference.

BACKGROUND OF THE INVENTION

1. Field of the Invention

The present invention relates to an information processing system and more particularly to a method and system for procuring telecommunications offerings (e.g., telecommunications products and/or services, etc.) on-line.

2. Discussion of the Background

From the perspective of the customers of telecommunication services, the interaction between them and the customer representatives have been inefficient and frustrating. Because of the emergence of the many, and often perplexing, telecommunication services, the experience that the customers undergo when procuring services is far from user friendly. Further, customers do not enjoy dialing into a call center to wait in queue for a customer representative to tend to them, with no guarantees that the customer representative can adequately service their needs.

Service providers, therefore, have sought to provide a self-service on-line system through the use of the World Wide Web (WWW). However, ineffective user interfaces and non-integrated systems have introduced the same, if not greater, level of frustration than interacting with a live human. In particular, in light of the sophistication of modern telecommunication services, a live person may be required to intercede in the procurement process.

Based on the foregoing, there is a clear need for improved approaches for servicing customers via an on-line system to procure telecommunications services. There is also a need to enhance the efficiency of provisioning telecommunications services for the customers. There is a further need to cater to customers of varying level of sophistication, such that customers who require greater assistance are given the necessary attention.

Based on the need to enhance the customer experience in procuring telecommunication services, an approach for implementing an on-line system that provides a user-friendly and efficient mechanism to acquire services from a service provider is highly desirable.

SUMMARY OF THE INVENTION

The present invention addresses the above stated and other needs by providing an on-line system that offers an effective mechanism to efficiently procure telecommunication services. The system provides a new customer experience for pre-sale, order processing, and post-sale support. For pre-sale services, a prospective customer links to the site of, for example, a proprietary telecommunications service provider (or directly at a site promoting itself) and are presented with product materials and tools. Once the prospective customer has determined the services appropriate to his/her business and the system has qualified them, they may enter a Shopping Cart/Service Ordering section of the site, select their services and click on, for example, an "Order Now" button to proceed. Afterwards, a new customer may then enter either the site (or other on-line applications, such as Interact, etc.) to check order status, manage existing services, place additional orders, pay on-line, etc.

According to one aspect of the present invention, there is provided a method for procuring telecommunications offerings remotely, including receiving a procurement inquiry, the procurement inquiry specifying a selected telecommunications offering from among voice, Internet and mobile telecommunications offerings; generating procurement data in response to the procurement inquiry and pertaining to the selected telecommunications offering; and transmitting the procurement data.

According to another aspect of the present invention, there is provided a method for servicing telecommunications offerings remotely, including receiving a service inquiry, the service inquiry specifying a search criteria with respect to an order for a telecommunications offering, a customer agent assigned for servicing a telecommunications offering order, and a move, change or disconnection (MCD) of a telecommunications offering order; and generating service data in response to the service inquiry and pertaining to the search criteria; and transmitting the service data.

According to another aspect of the present invention, there is provided a method for procuring and servicing telecommunications offerings remotely, including receiving a procurement inquiry and a service inquiry, the procurement inquiry specifying a selected telecommunications offering from among voice, Internet and mobile telecommunications offerings, the service inquiry specifying a search criteria with respect to an order for a telecommunications offering, a customer agent assigned for servicing a telecommunications offering order, and a move, change or disconnection (MCD) of a telecommunications offering order; generating procurement data in response to the procurement inquiry and pertaining to the selected telecommunications offering and service data in response to the service inquiry and pertaining to the search criteria; and transmitting the procurement and service data.

According to another aspect of the present invention, there is provided a method for procuring telecommunications offerings remotely, including submitting a procurement inquiry, the procurement inquiry specifying a selected telecommunications offering from among voice, Internet and mobile telecommunications offerings; and receiving procurement data. The procurement data is generated in response to the procurement inquiry and pertains to the selected telecommunications offering.

According to another aspect of the present invention, there is provided a method for servicing telecommunications offerings remotely, including submitting a service inquiry, the service inquiry specifying a search criteria with respect to an order for a telecommunications offering, a customer agent assigned for servicing a telecommunications offering order, and a move, change or disconnection (MCD) of a telecommunications offering order; and receiving service data. The service data is generated in response to the service inquiry and pertains to the search criteria.

According to another aspect of the present invention, there is provided a system for procuring and servicing telecommunications offerings, including a customer browser loaded on a customer client computer, the customer browser being configured to submit a procurement inquiry, the procurement inquiry specifying a selected telecommunications offering from among voice, Internet and mobile telecommunications offerings; a back office browser loaded on a back office client computer, the back office browser being configured to submit a service inquiry, the service inquiry specifying a search criteria with respect to an order for a telecommunications offering, a customer agent assigned for servicing a telecommunications offering order, and a move, change or disconnection (MCD) of a telecommunications offering order; and a server program loaded on a server computer and being configured to receive the procurement and service inquiries, generate procurement data pertaining the to the selected telecommunications offering and service data pertaining to the search criteria, and transmit the procurement and service data.

According to another aspect of the present invention, there is provided an apparatus for procuring telecommunications offerings remotely, including means for receiving a procurement inquiry, the procurement inquiry specifying a selected telecommunications offering from among voice, Internet and mobile telecommunications offerings; means for generating procurement data in response to the procurement inquiry and pertaining to the selected telecommunications offering; and means for transmitting the procurement data.

According to another aspect of the present invention, there is provided an apparatus for servicing telecommunications offerings remotely, including means for receiving a service inquiry, the service inquiry specifying a search criteria with respect to an order for a telecommunications offering, a customer agent assigned for servicing a telecommunications offering order, and a move, change or disconnection (MCD) of a telecommunications offering order; means for generating service data in response to the service inquiry and pertaining to the search criteria; and means for transmitting the service data.

According to another aspect of the present invention, a method for provisioning services via an on-line system is disclosed. The method includes receiving a service inquiry from a user, and selectively directing the user to a service center. The method also includes selectively providing a plurality of service options to the user. Further, the method includes generating a service order based upon the step of selectively providing the plurality of service options, and confirming the service order. The above arrangement advantageously provides an effective mechanism to procure services on-line.

According to another aspect of the present invention, an on-line system for procuring services is provided. The system includes a presentation section that is configured to provide a graphical user interface to a user, in which the user provides service inquiry information. The system also includes a business section that is configured to perform business rules and transactions based upon the service inquiry information. The user is selectively directed to a service center. Further, the system includes an interface section that is configured to facilitate access to data associated with the services and to interface with external systems for acquisition of the services. Under the above arrangement, the user is provided with a user-friendly approach to provisioning telecommunication services.

According to another aspect of the present invention, an on-line system for procuring services is disclosed. The system includes means for receiving a service inquiry from a user; means for selectively directing the user to a service center; means for selectively providing a plurality of service options to the user; means for generating a service order based upon the plurality of service options; and means for confirming the service order. This approach advantageously permits customers to procure services expediently.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method and system for procuring telecommunications products on-line are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figure 1:
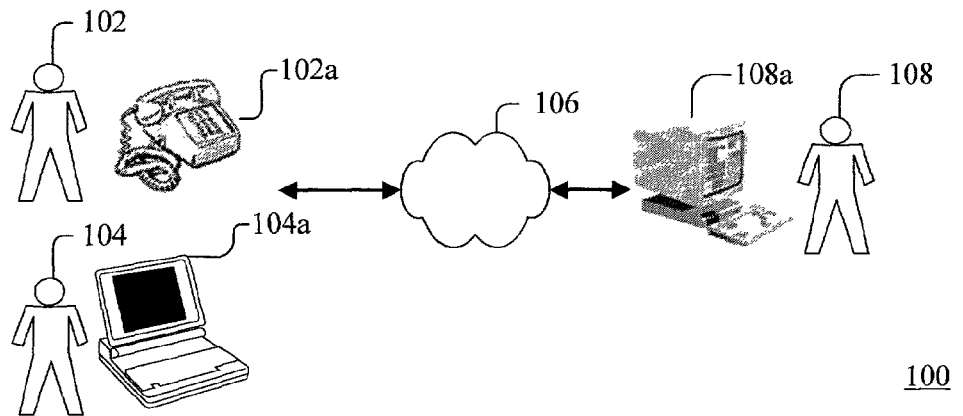
FIG. 1 is a top-level block diagram illustrating a system for procuring telecommunications products and/or services.

The present invention includes recognition of problems associated with tradition systems and methods for procuring telecommunications products and/or services. In FIG. 1, a system 100 for procuring telecommunications products and/or services is shown and includes one or more customers 102 and 104 and customer devices 102a and 104a (i.e., a telephone and personal computer) coupled to a communications network 106 (i.e., a Public Switched Telephone Network (PSTN) or the Internet). Numerous personnel 108, such as core customer representatives, implementation engineers, implementation coordinators, order distributors, etc., via devices 108a, can connect to the communications network 106 and are employed for procuring telecommunications products and/or services for the customers 102 or 104 under such flow.

Figure 2:
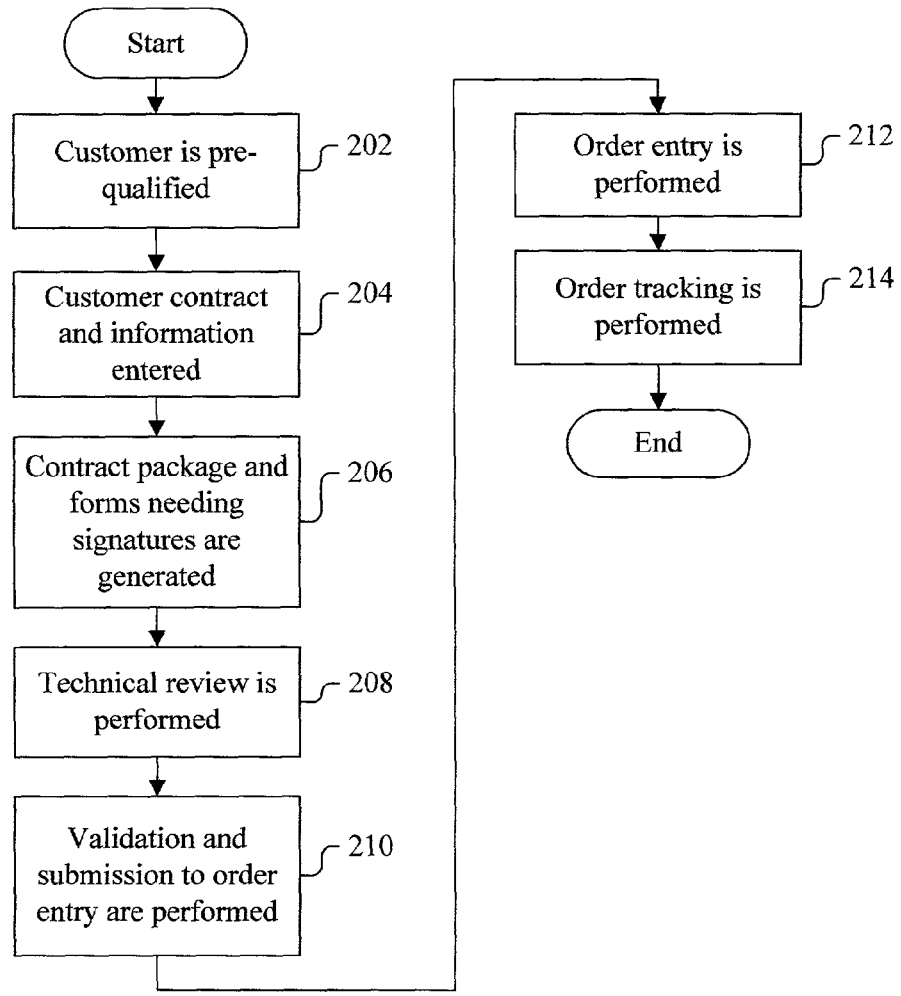
FIG. 2 is a flowchart illustrating a flow for procuring telecommunications products and/or services.

FIG. 2 is a flowchart illustrating a flow for procuring telecommunications products and/or services in the system 100. In FIG. 2, at step 202, the customer 102 or 104 is pre-qualified by a core customer representative 108 for telecommunications products and/or services desired by the customer 102 or 104. At step 204, customer contract and information are entered by the core customer representative 108. At step 206, a contract package and forms needing signatures are generated by the core customer representative 108. At step 208, an implementation engineer 208 performs a technical review of the telecommunications products and/or services desired by the customer 102 or 104. At step 210, validation and submission to order entry for the telecommunications products and/or services desired by the customer 102 or 104 are performed by an implementation coordinator 108. At step 212, order entry for the telecommunications products and/or services desired by the customer 102 or 104 is performed by the implementation coordinator, the implementation engineer and/or the order distributor 108. At step 214, order tracking is performed by the implementation coordinator 108, completing the flow for procuring telecommunications products and/or services.

Accordingly, such flow involves numerous personnel 108 and time-consuming processing steps 202-214 in order to procure telecommunications products and/or services for the customer 102 or 104. The present invention addresses the problems with such flow for procuring telecommunications products and/or services and is further described with reference to FIGS. 3-6.

Figure 3:
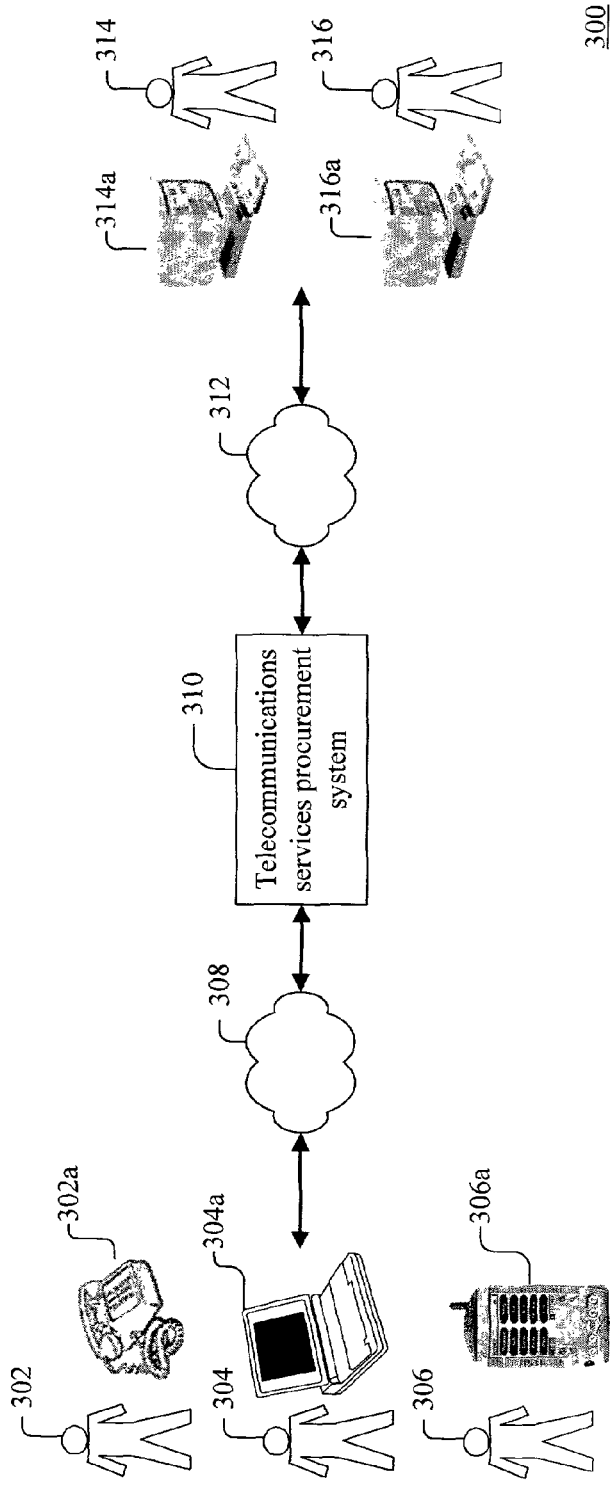
FIG. 3 is a top-level block diagram illustrating a system for procuring telecommunications products and/or services on-line.

Referring to the drawings, wherein like reference numerals designate identical or corresponding parts throughout the several views, and more particularly to FIG. 3 thereof, there is illustrated a top level block diagram of a system 300 for procuring telecommunications products and/or services on-line, according to the present invention. In FIG. 3, the system 300 may include, for example, one or more customers 302, 304 and 306 and respective customer devices 302a, 304a and 306a (e.g., telephones, personal computers, hand-held devices, etc.) for procuring telecommunications products and/or services on-line. The devices 302a, 304a and 306a may be coupled to a telecommunications service procurement system 310 via a communications network 308 (e.g., a Public Switched Telephone Network (PSTN), the Internet, an Intranet, etc.).

For devices 302a, such as conventional telephony devices, wireless telephony devices, etc., the present invention may be implemented via voice command, speech synthesis, Dual-Tone MultiFrequency (DTMF) input, etc., functions provided in the devices 302a and corresponding voice activated menu, speech recognition, DTMF detection, etc., functions provided by the telecommunications service procurement system 310 over the communications network 308 and based on the processes described in the present invention, as will be appreciated by those skilled in the relevant art(s).

For devices 304a, such personal computers, etc., the present invention may be implemented via the use of web browser, graphical user interface (GULI), etc., functions provided in the devices 304a and corresponding web server, etc., functions provided by the telecommunications service procurement system 310 over the communications network 308 and based on the processes described in the present invention, as will be appreciated by those skilled in the relevant art(s).

For devices 306a, such as personal digital assistants (PDAs), etc., the present invention may be implemented via the use of Wireless Application Protocol (WAP), Microsoft CE, Palm OS, GUI, etc., functions provided in the devices 306a and corresponding web server, etc., functions provided by the telecommunications service procurement system 310 over the communications network 308 and based on the processes described in the present invention, as will be appreciated by those skilled in the relevant art(s).

The system 300 and the telecommunications service procurement system 310 are further described herein. The system 300 includes software integration, which is further described in the commonly owned co-pending United States Patent Application to Felkey et al., filed herewith, entitled "METHOD AND SYSTEM FOR PROVIDING SOFTWARE INTEGRATION FOR A TELECOMMUNICATIONS SERVICES ON-LINE PROCUREMENT SYSTEM," Ser. No. 10/051,180.

Customer service personnel 314 and/or "swivel-chair" operators 316 may access the telecommunications service procurement system 310, for example, via a back office graphical user interface (GUI, not shown) running on the devices 314a and 316a over, for example, a proprietary communications network 312 (e.g., an Intranet, a virtual private network, etc.) in order to procure telecommunications products and/or services for the customers 302, 304 or 306. The customer service personnel 314 may provide, for example, customer service functions, while the swivel-chair operators 316 may be assigned to, for example, process accepted orders, process modified orders, process supplemental orders, etc.

Similarly, the customers 302, 304 or 306 may order telecommunications products and/or services on-line via a customer GUI (not shown) running on the devices 302a, 304a and 306a over the communications network 308. The back office GUI and the customer GUI are further described in the commonly owned co-pending United States Patent Application to Felkey et al., filed herewith, entitled "GRAPHICAL USER INTERFACE FOR PROCURING TELECOMMUNICATIONS SERVICES ON-LINE," Ser. No. 10/051,182.

In FIG. 3, the devices 302a, 304a and 306a and the respective devices 314a and 316a of the customer service personnel 314 and the swivel-chair operators 316 may communicate with the telecommunications service procurement system 310 using, for example, TCP/IP via the communications networks 308 and 312, respectively. The devices 302a, 304a and 306a and the devices 314a and 316a may include a modem function (e.g., dial-up, DSL, cable, wireless, etc.) that can log in to the telecommunications service procurement system 310 with user validation (e.g., via a personal identification number (PIN), user name and password, etc.).

The telecommunications service procurement system 310 may include all software and hardware to provide, for example, user account maintenance, validation and access control level (ACL) information, a directory server where a customer's personal information is kept, etc. The devices 302a, 304a and 306a, the devices 314a and 316a, the telecommunications service procurement system 310, etc., may be implemented using one or more of the computer system 701 of FIG. 7, for example.

Accordingly, the devices 302a, 304a and 306a, the devices 314a and 316a, the telecommunications service procurement system 310, etc., may include any suitable servers, workstations, personal computers (PCs), personal digital assistants (PDAs), Internet appliances, other devices, etc., capable of performing the processes of the present invention. The devices 302a, 304a and 306a, the devices 314a and 316a, the telecommunications service procurement system 310, etc., may communicate with each other using any suitable protocol via the communications networks 308 and 312.

It is to be understood that the system 300 in FIG. 3 is for exemplary purposes only, as many variations of the specific hardware used to implement the present invention are possible, as will be appreciated by those skilled in the relevant art(s). For example, the functionality of one or more of the devices 302a, 304a and 306a, the devices 314a and 316a, the telecommunications service procurement system 310, etc., may be implemented via one or more programmed computers or devices. To implement such variations as well as other variations, a single computer (e.g., the computer system 701 of FIG. 7) may be programmed to perform the functions performed by, for example, the devices 314a and 316a shown in FIG. 3. On the other hand, two or more programmed computers or devices, for example as in shown FIG. 7, may be substituted for any one of the devices 302a, 304a and 306a, the devices 314a and 316a, the telecommunications service procurement system 310, etc., of FIG. 3. Principles and advantages of distributed processing, such as redundancy, replication, etc., may also be implemented as desired to increase the robustness and performance of the system 300, for example.

The communications networks 308 and 312 may be implemented via one or more communications networks (e.g., the Internet, an Intranet, a wireless communications network, a satellite communications network, a cellular communications network, a Public Switched Telephone Network (PSTN), a hybrid network, etc.), as will be appreciated by those skilled in the relevant art(s). In a preferred embodiment of the present invention, the communications networks 308 and 312 may employ electrical, electromagnetic, optical signals, etc., that carry digital data streams, as are further described with respect to FIG. 7.

Figure 4:
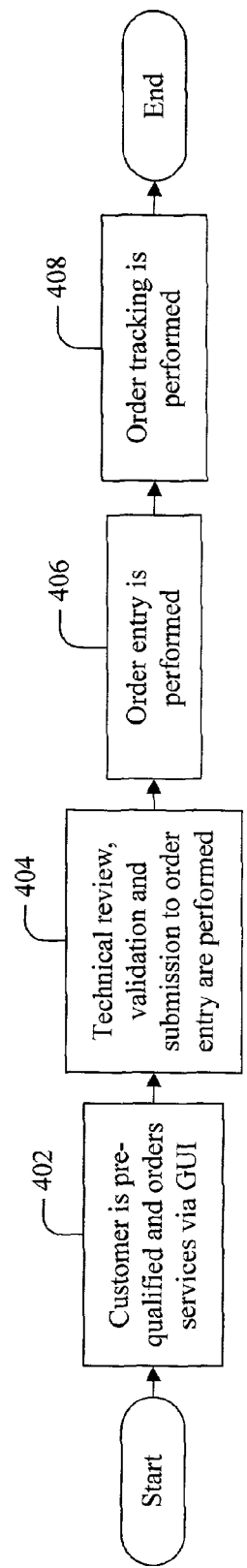
FIG. 4 is a flowchart illustrating a flow for procuring telecommunications products and/or services on-line.

FIG. 4 is a flowchart illustrating a flow for procuring telecommunications products and/or services on-line, according to the present invention. In FIG. 4, at step 402, the customer 302, 304 or 306 is pre-qualified and orders telecommunications products and/or services via the customer GUI. At step 404, technical review, validation and submission to order entry are performed by a service coordinator (e.g., customer service personnel 314, swivel-chair operators 316, etc.). At step 406, order entry for the telecommunications products and/or services desired by the customer 302, 304 or 306 is performed by the service coordinator. At step 408, order tracking is performed by the service coordinator, completing the flow for procuring telecommunications products and/or services, according to the present invention.

Accordingly, the flow for procuring telecommunications products and/or services, according to the present invention, does not involve numerous personnel 108 or time-consuming processing steps 202-210, in order to procure telecommunications products and/or services for a customer, as compared to the flow of FIGS. 1 and 2. Thus, the present invention addresses the noted problems with flow for procuring telecommunications products and/or services.

The method and system for procuring telecommunications products on-line may now be described with reference to FIGS. 5-6.

Figure 5A:
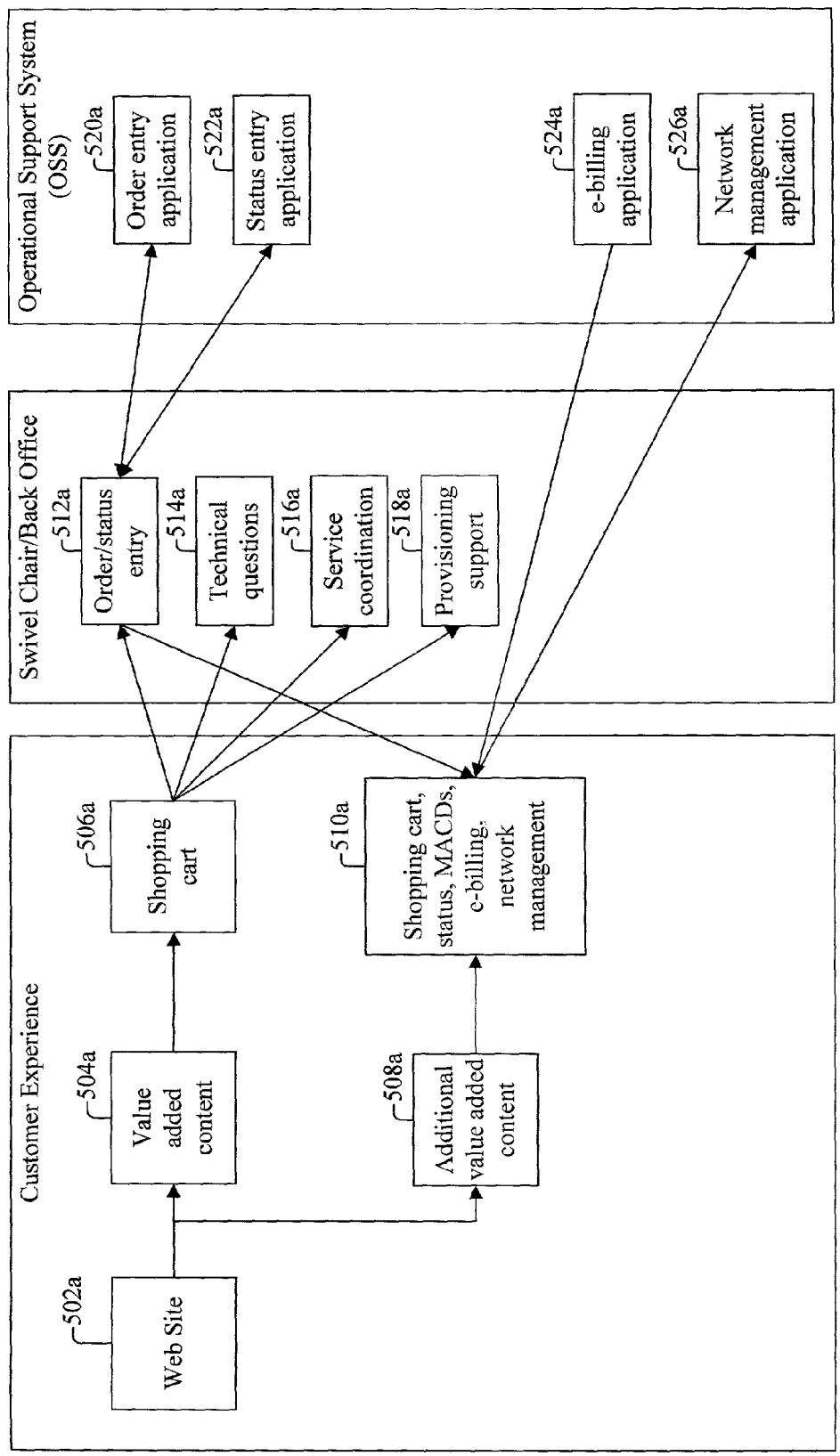
FIG. 5a is a high level block diagram illustrating functions performed by a system for procuring telecommunications products on-line.

FIG. 5a is a high level block diagram illustrating functions performed by a system for procuring telecommunications products on-line, according to the present invention. In FIG. 5a, the functions performed by the system include, for example, functions with respect to the customer 302, 304 and 306 experience, the swivel chair/back office (e.g., functions performed by the swivel chair 316 and/or the customer service personnel 314) and an operational support system (OSS).

The customer 302, 304 and 306 experience functions include, for example, web site functions 502a, value added content functions 504a and shopping cart functions 506a for new customers and additional value added content functions 508a and functions 510a for existing customers. The swivel chair/back office functions include, for example, order/status entry 512a, answering of technical questions 514a, service coordination 516a and provisioning support 518a. The OSS functions/applications include, for example, an order entry application 520a, a status entry application 522a, an electronic billing (e-billing) application 524a and a network management application 526a.

The customer experience includes, for example, providing pre-sale, service ordering and post-sale support. The customer experience begins as a prospective customer links to the web site or is brought directly to the web site via a click through mechanism (e.g., using a web browser). The web site functions 502a include, for example, providing a customer graphical user interface (GUI) over the communications network 308 as described in the commonly owned co-pending United States Patent Application to Felkey et al., filed herewith, entitled "GRAPHICAL USER INTERFACE FOR PROCURING TELECOMMUNICATIONS SERVICES ON-LINE," Ser. No. 10/051,182.

The prospective customer is then presented with valued added content functions 504a including, for example, an introduction/description of the web site, a demo that graphically walks the prospective customer through the online process, access to online tools, including tools for matching opportunities/solutions to products and qualifying prospects, obtaining price quotes, generating proposals/obtaining brochures to help justifying purchases, providing access to a live Network Consultant (e.g., via online chat, instant messaging, etc.), online shared white-boarding capabilities to facilitate joint network diagramming, etc., listings of voice, data and integrated products and services available for research and purchase online, access to equipment auctions, an "Order Now" capability, listings of partner products and services available for research and purchase online, articles describing how specific products can help small businesses, call outs featuring/highlighting growth products and services, etc.

Once the prospective customer has determined the services appropriate to his/her business and has been qualified online, the customer can access the shopping cart/service functions 504a of the web site, select desired services and, for example, click on an "Order Now" button to proceed. Afterwards, the customer is able to enter the web site to access the additional valued added content functions 508a via a member login function. The additional valued added content functions 508a include, for example, personalized content, automatically assigning (as well as resetting) user name and password with a return confirmation e-mail, access to main content/functional areas of the web site, access to tailored services, sending a page, conference call scheduling, online directory assistance, access to tailored articles on products ordered or related products (e.g., an Internet customer may have access articles on web hosting, etc.), access to existing orders, e-billing, access to a service/hierarchy organizer, access to switched/dedicated breakeven tools, access to cost allocation tools, searching capabilities (e.g., guided, keyword, ask a question format, etc.), pop-up menu/instant messaging for prospective customers who click around a lot without purchasing (e.g., to ask "Can we help you find anything?"), etc.

The shopping cart functions 506a include, for example, offerings of various products for a customer to draft an order via the "Order Now" button and ultimately submit a final order via a "Submit" button. The possible products that may be ordered online via the web site include, for example, local telephony, switched and dedicated long distance telephony, switched and dedicated toll free telephony, calling cards, cellular/Personal Communications Services (PCS), paging, dial-up Internet, conferencing, integrated messaging, Digital Subscriber Line (DSL), dedicated Internet, private line, frame relay, etc. In addition to the shopping cart functions 506a noted above, an existing customer may access the functions 510a that further may include, for example, a move, add, change or delete (MACD) orders function, an e-billing function, network management function, etc.

The swivel chair/back office functions 512a-518a are linked to the shopping cart functions 506a and 510a. In this respect, the web site functions 502a include, for example, providing a back office graphical user interface (GUI) over the communications network 312 as described in the commonly owned co-pending United States Patent Application to Felkey et al., filed herewith, entitled "GRAPHICAL USER INTERFACE FOR PROCURING TELECOMMUNICATIONS SERVICES ON-LINE," Ser. No. 10/051,182. The swivel chair 316 and the customer service 314 personnel can perform the swivel chair/back office functions 512a-518a via the back office GUI.

The order/status entry function 512a includes, for example, entering order/status information received via the customer GUI into the OSS order entry application 520 (e.g., OrderPro, etc.) and the OSS status generation application 522a (e.g., StatusPro, etc.). The OSS order entry application 520 provides, for example, order input, automated order transfer and tracking, one-time entry of recurring order information, online order editing, etc. The OSS status generation application 522a provides, for example, tracking data to be placed back into the system database, order capture, order submission, receiving center, credits, completions, jeopardy indicators, tracking order volume, tracking order intervals, tracking order aging, etc.

The entering order/status information can be performed manually by the swivel chair 316 and/or the customer service 314 personnel or automatically by the system 310. Once the order or status request has been submitted and stored in a database of the system 310, OSS personnel may be notified (e.g., via e-mail, instant messaging, etc.) with information regarding the order, such as the order number, date/time of request, request type, etc., to facilitate the OSS personnel in finding the order in the database.

If a customer requires additional, consultative, or sales support, the customer can access the technical questions function 514a (e.g., online chat, instant messaging, frequently asked questions (FAQs), etc.) and interact with the customer service personnel 314. The service coordination function 516a includes, for example, assigning a service coordinator to a customer. The service coordinator would be responsible and accountable for ensuring a positive e-commerce experience (e.g., providing regular updates, order tracking, moving a customer through the process, ensuring milestones are met, etc.).

An existing customer, via the functions 510a or through a web link, can access the OSS e-billing application 524a (e.g., IXplus, etc.). The OSS e-billing application 524a is an electronic billing, electronic bill presentment, electronic bill payment, etc., application providing the ability for the existing customer to, for example, review, analyze and pay invoices over the communications network 308 (e.g., via the Internet, etc.).

An existing customer, once authenticated (e.g., via a user id/password) and via the functions 510a or through a web link, also can access the OSS network management application 526a (e.g., Interact WebNMS, etc.). The existing customer can use the OSS network management application 526a to, for example, open trouble tickets, review trouble tickets, etc. The OSS network management application 526a, for example, utilizes web technology to provide an interface to view (in near-real time) utilization reports, traffic routing and trouble ticket processing through the customer GUI at the customer's desktop. The OSS network management application 526a, for example, features customer controlled reconfiguration (CCR), trouble ticket (TTK), usage reports for toll-free, dedicated access lines (DALs), frame relay and Asynchronous Transfer Mode (ATM) services, etc.

Figure 5B:
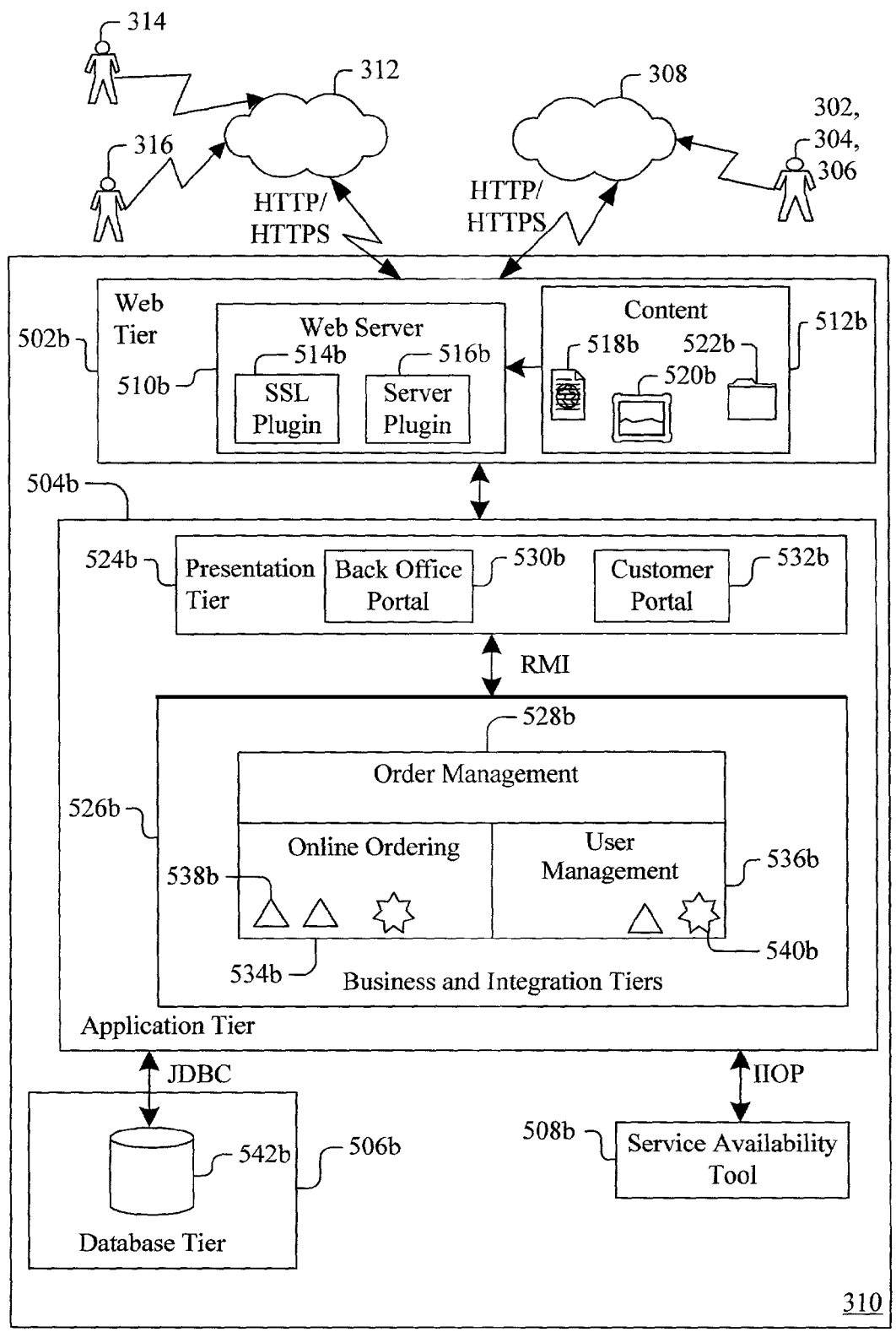
FIG. 5b is a top level block diagram illustrating a logical architecture employed in the system for procuring telecommunications products on-line.

FIG. 5b is a top level block diagram illustrating a logical architecture employed in the system 310 for procuring telecommunications products on-line, according to the present invention. In FIG. 5b, the logical architecture includes a web tier 502b, an application tier 504b, a database tier 506b and a service availability tool (SAT) 508b. The application tier 504b communicates with the database tier 506b using, for example, Java DataBase Connectivity (JDBC). The application tier 504b communicates with the SAT 508b using, for example Internet Inter-ORB Protocol (IIOP).

The web tier 502b is responsible for delivering web content 512b to the client machines 302a, 304a and 306a and 314a and 316a of FIG. 3. The client machines 302a, 304a and 306a and 314a and 316a running a web browser (e.g., Internet Explorer, Netscape, etc.) connect requested web pages and images from the web site via, for example, HyperText Transport Protocol (HTTP) and HyperText Transport Protocol Secure (HTTPS). Although lower layers generate the system's HyperText Markup Language (HTML) pages, the web tier 502b manages the building blocks of the HTML pages, static content 518b, images 520b, Javascript scripts and cascading style sheets 522b, etc.

The HTTP and HTTPS requests come in through a load balancer, which routes new requests to a range of web servers 510b (e.g., Apache web servers, etc.) to spread out the load. Once passed to the web server 510b, subsequent requests during the session are given to that server. The load-balancing machine may employ Secure Socket Layer (SSL) session identifiers of associated certificates (e.g., Verisign, etc.) via SSL plugin 514b (e.g, a Raven SSL plugin, etc.) to maintain the state of SSL connections with clients.

The web servers 510b serve up requests that they can fulfill while they forward user actions and HTML requests to the presentation tier 524b, which runs on an application server. Again, new sessions are routed to a series of available application servers to spread out the load, while subsequent requests go to the same application server.

A server or proxy plugin 516b (e.g., WebLogic Server (WLS) plugin, etc.) is also integrated with the web server 510b and is a participant in such a clustered environment. The server plugin 516b enables servlet clustering by acting as a proxy that intercepts HTTP requests and forwards them on to one of the servers 510b in the cluster. The proxy 516b maintains HTTP session state and load-balances across the cluster using various techniques and algorithms (e.g., Round-robin, etc.). Furthermore, the proxy 516b enables HTTP session replication to a database, file system or in-memory (e.g., via multicast transmissions), which handles recovery of failed sessions.

The SSL plugin 514b is a module that integrates with the web server 510b. The SSL plugin 514b provides licensed 128-bit strong cryptography (e.g., RSA, etc.) using digital certificates (e.g., Verisign, etc.) in order to enable the web server 510b to establish SSL sessions with the client browsers.

The application tier 504b includes a presentation tier 524b framework (e.g., Cygent, etc.). Functionality from the presentation tier 524b framework (e.g., Cygent's Small Business Portal, etc.) is leveraged to build a customer portal 532b. This is achieved by reusing and/or configuring the existing JavaServer Pages (JSPs) and objects including transition and display policies of the presentation tier framework 524b.

A back office portal 530b, on the other hand, is custom constructed, but designed with the presentation tier 524b framework (e.g., the Cygent framework, etc.) in mind. In other words, the pages are named in a consistent manner with the rest of the portals, and the same is true for the transition policies and display policies and objects.

The application tier 504b includes a business and integration tier 526b (e.g., Cygent's Business tier and Integration tier, etc.). The business and integration tier 526b is a home for various components, such as activity and domain objects of three functional areas included therein: order management 528b, online ordering 534b and user management 536b. In FIG. 5b, communications messaging interfaces (CMIs) 538b and handlers 540b are also shown. The business and integration tier 526b communicate with the presentation tier 524b using, for example, Remote Method Invocation (RMI).

Domain objects to handle the ordering functionality (e.g., Cygent's ordering functionality domain objects, etc.) were extended and a custom CMI and a pricing adapter as an extension to a pricing scheme (e.g., Cygent's pricing scheme, etc.) were designed. Activity objects also referred to as managers or controllers (e.g., Cygent managers or controllers, etc.) are used to coordinate the ordering activities and functions. Business rules (e.g., Cygent, etc.) to constrain the ordering activities as needed are also employed. Existing database 542b tables (e.g., Cygent, etc.) are used to persist online ordering data. Additional tables are designed to extend such schema. Such tables are also mapped to display objects and domain objects (e.g., using a TopLink for Java tool, etc.).

Pre-qualifying a customer 302, 304 or 306 for products and/or services employs an application to make a call out to the SAT 508b, which is, for example, Common Object Request Broker Architecture (CORBA) based. A custom CMI and adapter was designed to handle that function.

The above and other changes, extensions and custom designs are described in the commonly owned co-pending United States Patent Application to Felkey et al., filed herewith, entitled "METHOD AND SYSTEM FOR PROVIDING SOFTWARE INTEGRATION FOR A TELECOMMUNICATIONS SERVICES ON-LINE PROCUREMENT SYSTEM," Ser. No. 10/051,180.

Figure 5C:
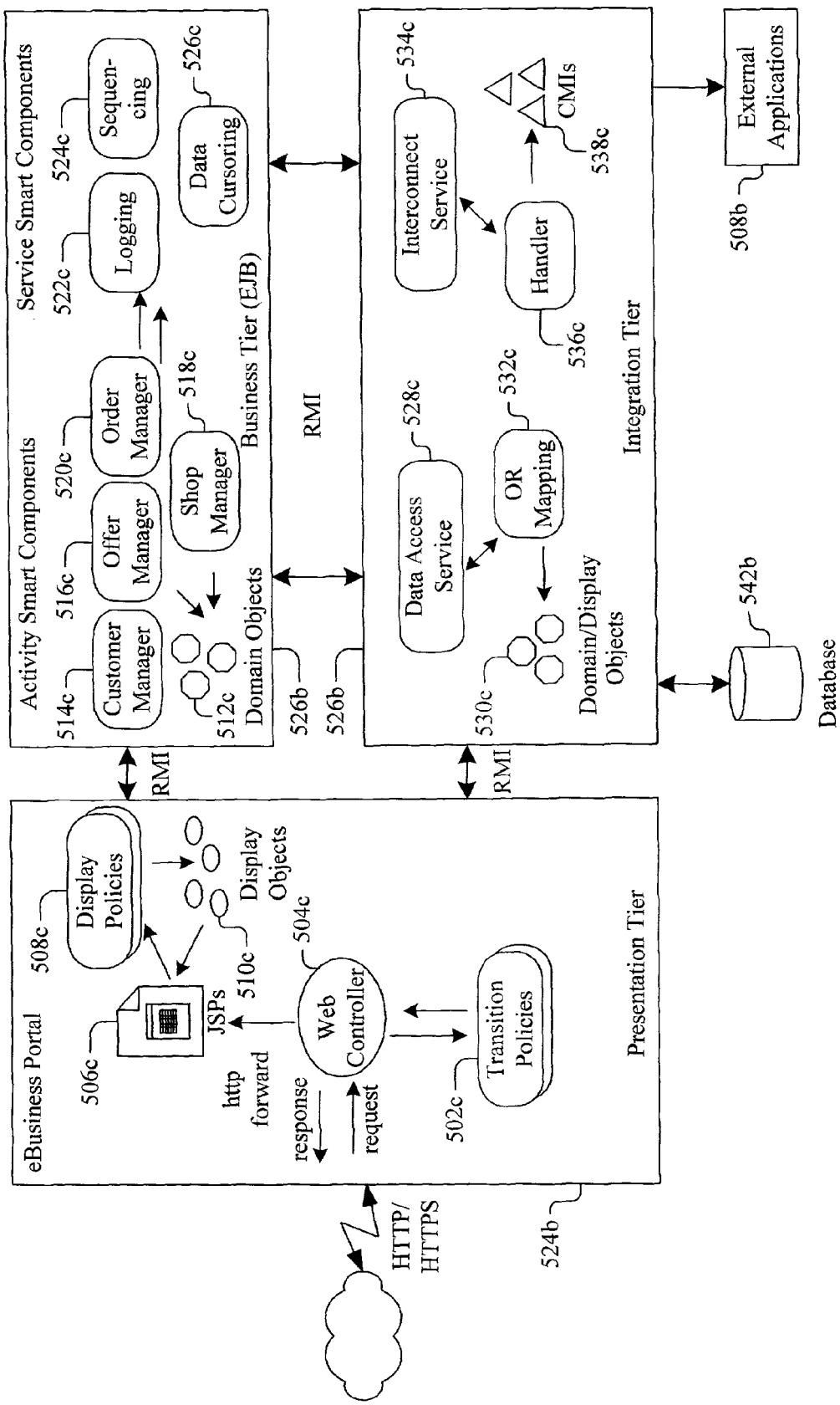
FIG. 5c is a block diagram illustrating an architectural framework employed in the logical architecture of FIG. 5b.

FIG. 5c is a block diagram illustrating an architectural framework (e.g., Cygent's, etc.) employed in the logical architecture of FIG. 5b, according to the present invention. In FIG. 5c, the architecture framework (e.g., Cygent's, etc.) employed in the logical system architecture of FIG. 5b is divided into three distinct tiers: the presentation tier 524b, which is responsible for production of web pages and LRL navigation, the business tier 526b, which is responsible for exercising the business rules and transactions and the integration tier 526b, which is responsible for facilitating access to persisted data as well as interfacing with external systems or applications 508b.

This grouping of services into separate tiers yields a product that is well designed not only for the specific problem but also structured for general extensibility. The presentation tier 524b includes a web controller 504c, which is a Java Servlet acting as a traffic cop that is responsible for routing requests to the appropriate Java server page (JSP) files 506c or transition policy objects 502c. The transition policies 502c are Java objects, which provide navigation and validation logic. The JSPs 508c are essentially HTML files with embedded Java code for display of dynamic content. A JSP tag library is used to facilitate the use of display objects 510c and display policies 508c that can handle process logic to display a page. The display objects 510c are read-only lightweight objects that shadow domain objects 512c. In that respect, a display object may represent a subset or all of the domain objects 512c attributes. Furthermore, a display object 510c may be mapped to one or more domain objects 512c in order to reduce network traffic and object distribution. Once used, the display objects 510c are discarded.

The business tier 526b is a core of the smart component server. It includes two types of component groups: activity smart components 514c, 516c, 518c and 520c and service smart components 522c, 524c and 526c. The activity smart components 514c, 516c, 518c and 520c are implemented as stateless session beans using the WebLogic Enterprise JavaBeans (EJB) Server. These components are essentially business rule objects (i.e., controllers), which manipulate and control the domain objects 512c. The service smart components 522c, 524c and 526c provide services that the activity smart components 514c, 516c, 518c and 520c employ, such as logging 522c, sequencing 524c and data cursoring 526c. The business tier 526b also is responsible for user authentication functions.

The integration tier 526b acts as a gateway to the data store 542b and to external interfaces to external applications 508b. This integration tier 526b provides access to data stores 542b via a data access service 528c, which employs TopLink for Java and is the object relational mapping tool to facilitate the persistence. In addition, the data access service 528c provides serializable Java objects 530c, known as value objects, which can be either display objects or domain objects that are passed by value to one of the tiers above. These core objects address Shop, Offer, Quote, Order, Customer, Sales, Business Rules, Interactions, Profiles, Bill Presentment, Payment, Trouble Ticket and Notice management specifically for telecommunications product transactions. Both the presentation 524b and the business 526b tiers have direct access to the integration tier 526b.

Access to external interfaces is facilitated via a communications messaging interface (CMI) 538c of an interconnect service 534c, CMI policies and custom adapters. CMIs provide a mechanism that allows the framework to loosely couple the core functionality with custom components. The integration tier 526b further includes OR mapping 532c and handler 536c.

Figure 6A:
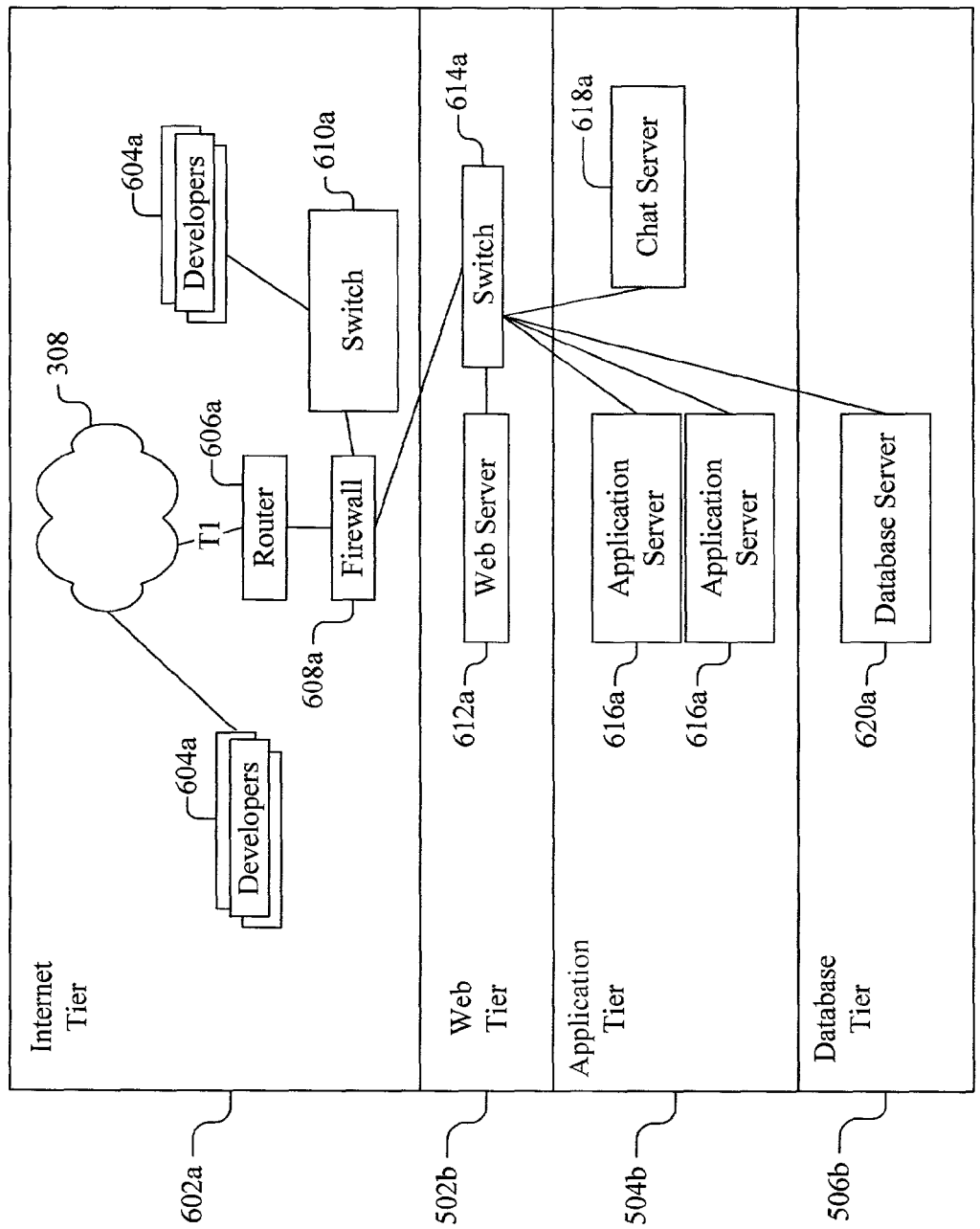
FIG. 6a is a top level block diagram illustrating a physical architecture employed in the system for procuring telecommunications products on-line in a development environment.
Figure 6B:
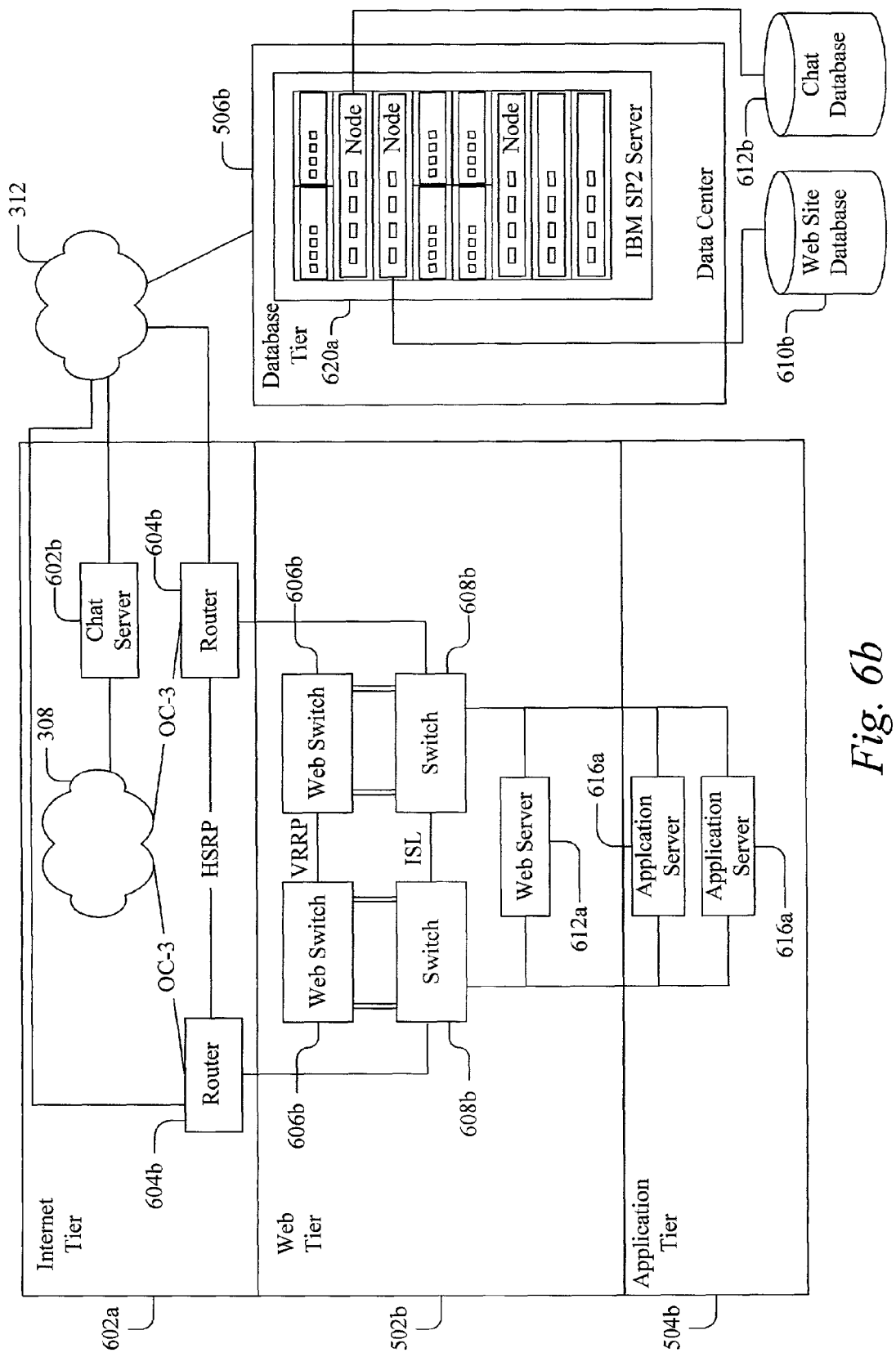
FIG. 6b is a top level block diagram illustrating a physical architecture employed in the system for procuring telecommunications products on-line in a development, staging or production environment.
Figure 6C:
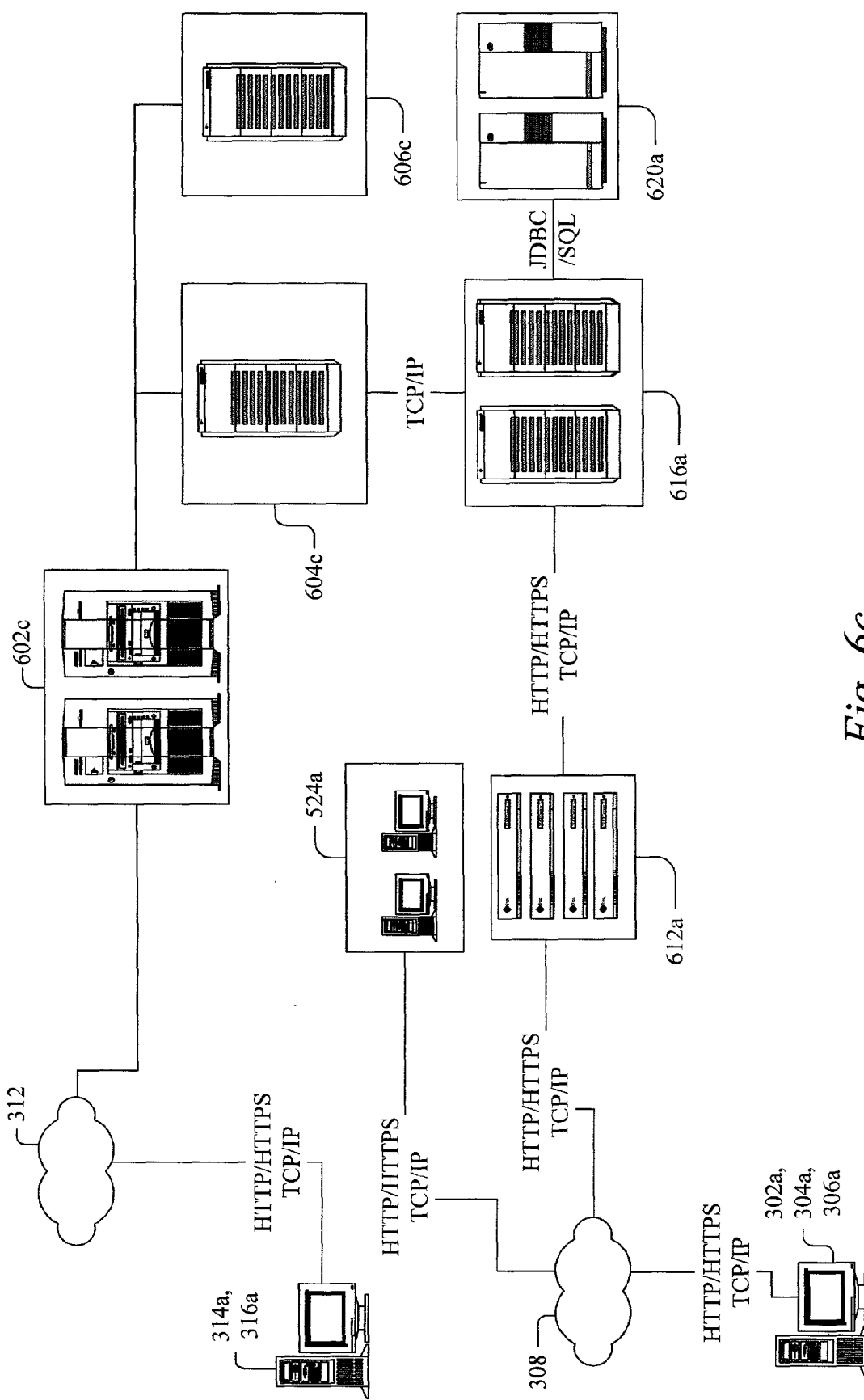
FIG. 6c is a top level block diagram illustrating a physical architecture employed in the system for procuring telecommunications products on-line in a production environment.

FIG. 6a is a top level block diagram illustrating a physical architecture employed in the system 300 for procuring telecommunications products on-line in a development environment, according to the present invention. FIG. 6b is a top level block diagram illustrating a physical architecture employed in the system 300 for procuring telecommunications products on-line in a development, staging or production environment, according to the present invention. FIG. 6c is a top level block diagram illustrating a physical architecture employed in the system 300 for procuring telecommunications products on-line in a production environment.

In FIGS. 6a-6c, the physical architecture includes the hardware platform, for example: (i) network routers 606a and 604b, (ii) switches 610a (e.g., Extreme Networks BlackDiamond L3 switch, etc.), 614a, 606b (e.g., redundant Alteon 180e load balancers web switches, etc.) and 608b (e.g., Cisco 5509 switches, etc.), (iii) firewalls 608a, (iv) web servers 612a (e.g., Apache web servers with Raven SSL plugin, etc.), (v) application servers 616a (e.g., running Cygent/WebLogic servers, etc.), (vi) chat servers 618a and 602b, (vii) database servers 620a (e.g., IBM SP2, RS/6000 servers running Oracle, etc.), (viii) databases 610b and 612b (e.g, RAID protected storage, mirrored disk storage, etc.), (ix) site intelligence servers 602c, (x) e-billing servers 524a (e.g., running eShare NetAgent, etc.), (xi) application servers 604c (e.g., running Interwoven, etc.), and (xii) application servers 606c (e.g., running NetGenisis, etc.).

The present invention includes development, staging and production environments. Each environment is designed around a multi-tier hierarchy (e.g., Internet tier 602a, web tier 502b, application tier 504b, database tier 506b, etc.), which is the physical implementation of the logical system architecture of FIG. 5b.

The Internet tier 602a includes, for example, all actors and machines outside the system 310 domain. This includes client users 302, 304, 306, 314 and 316 of the system 310 and the Internet infrastructure to reach the web site. When clients first connect to the web site to use the main system 310 where authentication is performed, the system 310 sets up a secure session so that all information exchanged between clients and the web site is encrypted. This is initiated by presenting a digital certificate to the client, which is verified (e.g., by Verisign). The digital certificate is then used to setup a secure socket connection over which data transfer is encrypted and private.

The client devices 302, 304, 306, 314 and 316 employ web browsers that support secure socket layer (SSL) communication (e.g., Netscape Communicator 4.x and above and Internet Explorer 4.x and above, both of which support SSL and automatically know that Verisign is a trusted certificate authority).

The web tier 502b includes, for example, the web servers 612a (e.g., running Apache, etc.) and the switches 614a, 606b and 608b. Embedded within the Apache servers are the two plugins: (i) the WebLogic module 516b for proxying HTTP requests for servlets and files to the application servers 616a in the back end subsystem and for doing load balancing of the proxy requests to all available application servers 616a as well as fail over should one of the application servers 616a crash and (ii) the Raven SLL plugin 514b, which manages the SSL certificates for secure HTTP sessions.

The application tier 504b includes the application servers 616a, which provide functionality in the areas of chat server 618a and 602b capabilities and WebLogic Server services. The application servers 616a that run the WebLogic Server are not only redundant, but like the web servers 612a, provide seamless fail over. The application servers 616a replicate users' session state across application servers 616a in order to provide a clustered application tear.

The database tier 506b includes, for example, an IBM server 620a that houses an Oracle database instance. The development environment and the staging environment utilize a single database instance. The production environment utilizes a highly-available configuration between a primary Oracle database server and a backup server. The production database is also replicated and is on standby in case both database servers become unreachable for some reason.

The exemplary hardware and software that may be employed in the systems of FIGS. 6a-6c are further described in U.S. Provisional Patent Application No. 60/263,222 of Diemer et al., entitled "ON-LINE SERVICING SYSTEM," filed on Jan. 23, 2001. In FIG. 6c, a site intelligence solution for the web site employs the use of a custom build servlet running on the site intelligence server 602c that intercepts all HTTP/HTTPS requests that are sent to the web site web server 612a. The servlet then writes a log file that contains information for site Intelligence data mining.

After receiving the HTTP/HTTPS request, the servlet forwards on the request to the Cygent servlet for Cygent processing. In this way, the normal operation of the web site is unaffected by the site intelligence servlet. The log file that is written by the servlet is separate from the Apache log, Cygent log and WebLogic log. The main advantage of this solution is its unobtrusiveness into the architecture, meaning that it can be changed independently of the architecture. It is also a scalable solution, meaning that it can be built upon with minimal impact to the rest of the architecture. After the log file is created, the application sever 606c (e.g., running a NetGenesis engine, etc.) parses the log file and stores the information in a database. At this point in the process, access via the application server 602c to run reports is possible.

Content management is made possible via the application server 604c (e.g., running Interwoven, etc.). E-billing is made possible via the application server 524a (e.g., running eShare NetAgent, etc.).

Exemplary software and hardware configurations for the system of FIG. 6c are as follows: (i) the web server 612a (e.g., SW: Apache 1.3.12 with RavenSSL 1.4.3 and Weblogic Proxy Module v5.1, HW: 4—Sun Netra T1, OS: Sun Solaris 2.7, etc.); (ii) the application servers 616a (e.g., SW: Cygent 3.1, BEA Weblogic 5.1, JDK 1.3, HW: 2—Sun 420R, OS: Sun Solaris 2.7, etc.); (iii) the database servers 620a (e.g., SW: Oracle 8.1.7, HW: IBM RS/6000, OS: AIX 4.3.3, etc.); (iv) the e-billing server 524a (e.g., SW: eShare NetAgent 5.0, HW: Compaq Prol. c1380, OS: MS Windows NT, 4.0, etc.); (v) the site intelligence server 602c (e.g., SW: Intelligence Svr 5.0, Infralens Web Srv 5.0, OS: MS Windows NT, etc.); (vi) the application server 604c (e.g., SW: Interwoven 4.5.1, Apache 1.3.12, Raven SSL 1.4.3, HW: Sun E420R, OS: Solaris 2.7, etc.); and (vii) the application server 606c (e.g., SW: NetGeneis 5.0, HW: Sun E420R, OS: Solaris 2.7, etc.)

Figure 6D:
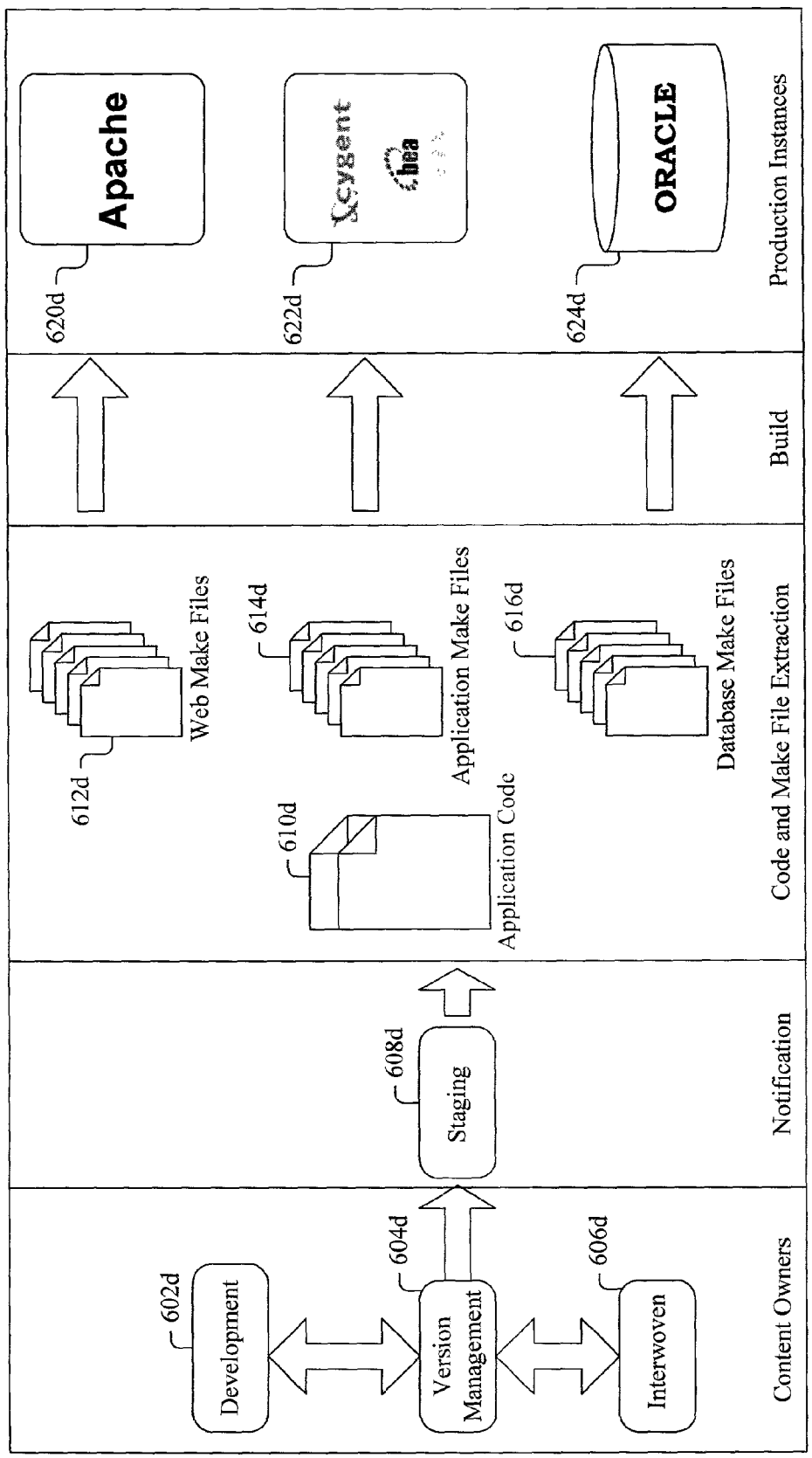
FIG. 6d is a top level block diagram illustrating processes for moving content changes from a staging environment to a production environment.

FIG. 6d is a top level block diagram illustrating processes for moving content changes from a staging environment 608d to a production environment 620d-624d, according to the present invention. The production environment supports web site customers 320, 304 and 306 as well as internal users 314 and 316. The production environment maintains a pristine version of the web site application. A build of the web site application from the staging environment is placed into the production environment.

The build of the web site is extracted from PVCS Version Manager 604d from development 602d and Interwoven 606d content owners. The build of the system in the production environment is accomplished using build scripts bundled with the code in PVCS 604d. A final version of the web site is extracted after quality assurance is completed. The build of web site includes configuration files 612d for the web 502b and 614d for the application 504b tiers. The application tier 504b of the build also includes file content (e.g., Html, Java, JSP, etc.). The database tier 506b of the build includes product data load as well as creation of the Cygent and custom Oracle objects.

Content management and site intelligence and code changes may be ongoing processes in the production environment. Content management allows the ability to update certain content on the web site. Code changes from developers 602d are for maintenance and enhancements. Site intelligence provides data mining (e.g., OnLine Analytical Processing (OLAP), etc.) capabilities to gather and report on various metrics on the web site. Content management (e.g., Interwoven) and code changes can be seen as content updates to the web site.

The production environment receives three types of content changes after the initial build: (i) code changes from developers 602b, (ii) file based changes from content management 606d (e.g., Interwoven) and (iii) database based changes from data content records 606d (e.g., Interwoven). These changes are present in the staging environment 608d before they are moved to the production environment. The changes are migrated to the production environment using build scripts. The diagram in FIG. 6d illustrates the process of moving content changes 604d from the staging environment 608d to the production environment 620d-624d.

The content owner (development 602d or Interwoven 606d) send a notification (e.g., via e-mail, etc.) indicating that a change needs to be migrated from staging 608d to production. At this point, a build from PVCS 604d is extracted and the make files 612d-616d associated with the build are used to make the necessary updates to production instances 620d-624d. The changes are placed into PVCS 604d by the content owners for extract and build.

The present invention may store information relating to various processes described herein. Such information may be stored in one or more memories, such as a hard disk, optical disk, magneto-optical disk, RAM, etc. One or more databases, such as the databases included in the systems and methods of FIGS. 3-6, may store the information used to implement the present invention. The databases may be organized using data structures (e.g., records, tables, arrays, fields, graphs, trees, and/or lists) included in one or more memories, such as the memories listed above or any of the storage devices listed below in the discussion of FIG. 7, for example.

The previously described processes may include appropriate data structures for storing data collected and/or generated by the systems and processes of FIG. 3-6 in one or more databases thereof. Such data structures accordingly may include fields for storing such collected and/or generated data. In a database management system implementation, data may be stored in one or more data containers, each container including records and the data within each record may be organized into one or more fields. In a relational database systems implementation, the data containers may be referred to as tables, the records may be referred to as rows and the fields may be referred to as columns. In an object-oriented database implementation, the data containers may be referred to as object classes, the records may be referred to as objects and the fields may be referred to as attributes. Other database architectures may be employed and may use other terminology. Systems that implement the present invention may not be limited to any particular type of data container or database architecture.

All or a portion of the invention (e.g., as described with respect to FIGS. 3-6) may be conveniently implemented using one or more conventional general purpose computers, microprocessors, digital signal processors, micro-controllers, etc., programmed according to the teachings of the present invention (e.g., using the computer system of FIG. 7), as will be appreciated by those skilled in the computer art. Appropriate software may be readily prepared by programmers of ordinary skill based on the teachings of the present disclosure, as will be appreciated by those skilled in the software art. In addition, the present invention (e.g., as described with respect to FIGS. 3-6) may be implemented by the preparation of application-specific integrated circuits or by interconnecting an appropriate network of conventional component circuits, as will be appreciated by those skilled in the electrical art(s). Further, the present invention may be implemented on the World Wide Web (e.g., using the computer system of FIG. 7).

Figure 7:
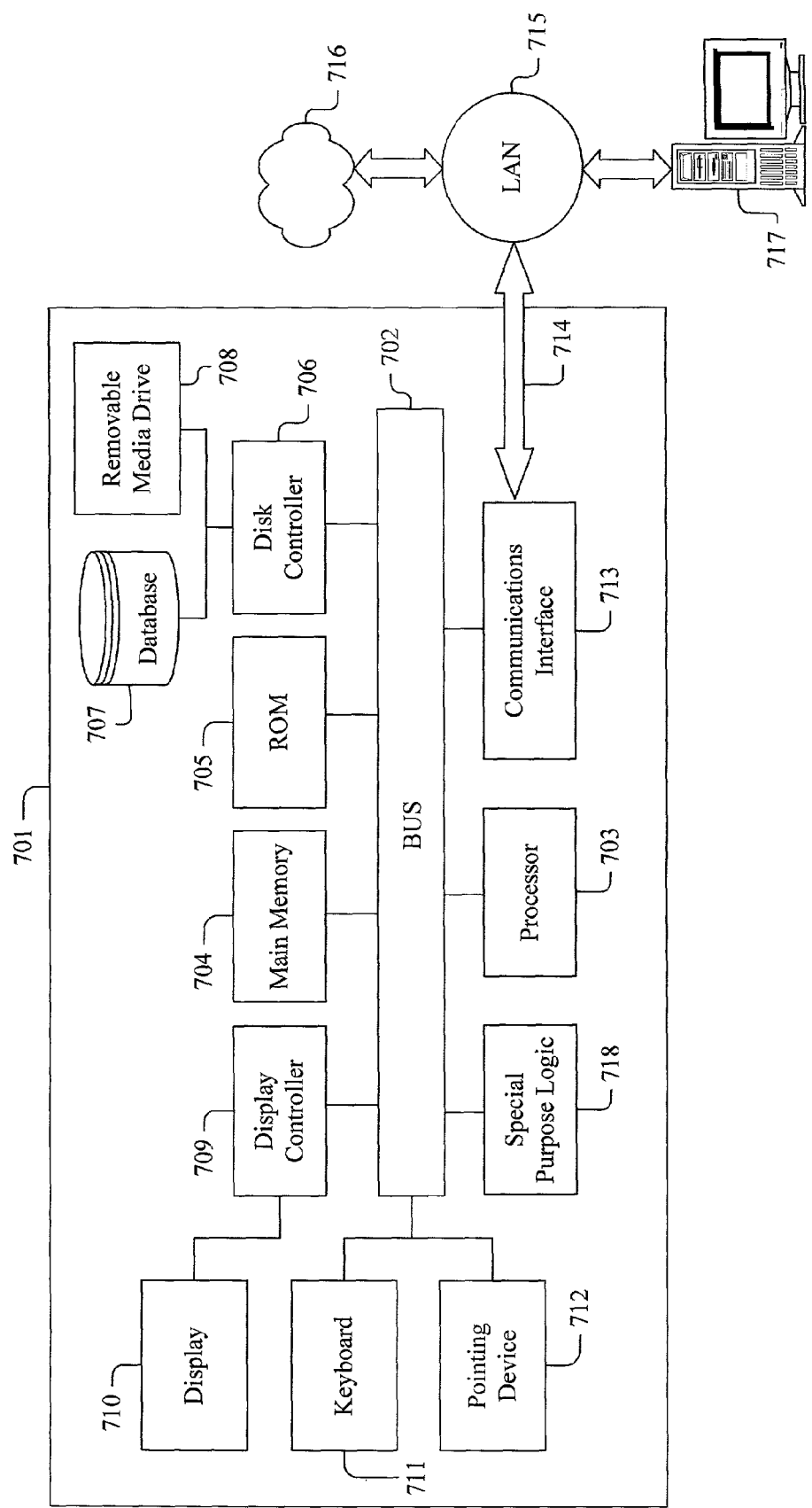
FIG. 7 is an exemplary computer system, which may be programmed to perform one or more of the processes of the present invention.

FIG. 7 illustrates a computer system 701 upon which the present invention (e.g., systems and methods of FIGS. 3-6, etc.) may be implemented. The present invention may be implemented on a single such computer system or a collection of multiple such computer systems. The computer system 701 includes a bus 702 or other communication mechanism for communicating information, and a processor 703 coupled to the bus 702 for processing the information. The computer system 701 also includes a main memory 704, such as a random access memory (RAM), other dynamic storage device (e.g., dynamic RAM (DRAM), static RAM (SRAM), synchronous DRAM (SDRAM)), etc., coupled to the bus 702 for storing information and instructions to be executed by the processor 703. In addition, the main memory 704 can also be used for storing temporary variables or other intermediate information during the execution of instructions by the processor 703. The computer system 701 further includes a read only memory (ROM) 705 or other static storage device (e.g., programmable ROM (PROM), erasable PROM (EPROM), electrically erasable PROM (EEPROM), etc.) coupled to the bus 702 for storing static information and instructions.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices 718, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, etc.

The computer system 701 may also include a display controller 709 coupled to the bus 702 to control a display 710, such as a cathode ray tube (CRT), liquid crystal display (LCD), active matrix display, plasma display, touch display, etc., for displaying or conveying information to a computer user. The computer system includes input devices, such as a keyboard 711 including alphanumeric and other keys and a pointing device 712, for interacting with a computer user and providing information to the processor 703. The pointing device 712, for example, may be a mouse, a trackball, a pointing stick, etc., or voice recognition processor, etc., for communicating direction information and command selections to the processor 703 and for controlling cursor movement on the display 710. In addition, a printer may provide printed listings of the data structures/information of the systems and methods shown in FIGS. 3-6, or any other data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. Execution of the arrangement of instructions contained in the main memory 704 causes the processor 703 to perform the process steps described herein. One or more processors in a multi-processing arrangement may also be employed to execute the sequences of instructions contained in main memory 704. In alternative embodiments, hard-wired circuitry may be used in place of or in combination with software instructions. Thus, embodiments of the present invention are not limited to any specific combination of hardware circuitry and/or software.

Stored on any one or on a combination of computer readable media, the present invention includes software for controlling the computer system 701, for driving a device or devices for implementing the invention, and for enabling the computer system 701 to interact with a human user (e.g., a user of the systems and methods of FIGS. 3-6, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716, such as the Internet. For example, the communication interface 713 may be a digital subscriber line (DSL) card or modem, an integrated services digital network (ISDN) card, a cable modem, a telephone modem, etc., to provide a data communication connection to a corresponding type of telephone line. As another example, communication interface 713 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 713 sends and receives electrical, electromagnetic and/or optical signals that carry digital data streams representing various types of information. Further, the communication interface 713 can include peripheral interface devices, such as a Universal Serial Bus (USB) interface, a PCMCIA (Personal Computer Memory Card International Association) interface, etc.

The network link 714 typically provides data communication through one or more networks to other data devices. For example, the network link 714 may provide a connection through local area network (LAN) 715 to a host computer 717, which has connectivity to a network 716 (e.g. a wide area network (WAN) or the global packet data communication network now commonly referred to as the "Internet") or to data equipment operated by service provider. The local network 715 and network 716 both use electrical, electromagnetic and/or optical signals to convey information and instructions. The signals through the various networks and the signals on network link 714 and through communication interface 713, which communicate digital data with computer system 701, are exemplary forms of carrier waves bearing the information and instructions.

The computer system 701 can send messages and receive data, including program code, through the network(s), network link 714 and communication interface 713. In an Internet example, a server (not shown) might transmit requested code belonging to an application program for implementing an embodiment of the present invention through the network 716, LAN 715 and communication interface 713. The processor 703 may execute the transmitted code while being received and/or store the code in storage devices 707 or 708 or other non-volatile storage for later execution. In this manner, computer system 701 may obtain application code in the form of a carrier wave. With the system of FIG. 7, the present invention may be implemented on the Internet as a Web Server 701 performing one or more of the processes according to the present invention for one or more computers coupled to the Web server 701 through the network 716 coupled to the network link 714.

The term "computer readable medium" as used herein refers to any medium that participates in providing instructions to the processor 703 for execution. Such a medium may take many forms, including but not limited to, non-volatile media, volatile media, transmission media, etc. Non-volatile media include, for example, optical or magnetic disks, magneto-optical disks, etc., such as the hard disk 707 or the removable media drive 708. Volatile media include dynamic memory, etc., such as the main memory 704. Transmission media include coaxial cables, copper wire, fiber optics, including the wires that make up the bus 702. Transmission media can also take the form of acoustic, optical, or electromagnetic waves, such as those generated during radio frequency (RF) and infrared (IR) data communications. As stated above, the computer system 701 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 715 and 716. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but rather covers various modifications and equivalent arrangements, which fall within the purview of the appended claims.

What is claimed is:

1. A method for procuring telecommunications offerings, comprising:
   receiving, via at least one processor, a pre-sale procurement inquiry from a customer application, the pre-sale procurement inquiry specifying one or more selected telecommunications offerings from a plurality of offerings including voice service, data access service and mobile telecommunications service, the pre-sale procurement inquiry being directed at least to one or more telecommunication services to which a customer who is not yet a subscriber is considering a subscription;
   providing, via the at least one processor in response to the pre-sale procurement inquiry, a customer-selectable option to access a network consultant via instant messaging;
   generating, via the at least one processor, pre-sale procurement data relating to displaying at a graphical user interface at a customer device via the customer application the one or more selected telecommunications offerings in response to the pre-sale procurement inquiry, wherein the pre-sale procurement data includes data for configuring the graphical user interface at the customer device to present a contract package and one or more forms requiring customer authorization to complete a service order of one or more of the selected telecommunications offerings; and
   transmitting, via the at least one processor, the pre-sale procurement data to the customer application,
   wherein the pre-sale procurement data includes data for the customer application to support an online collaboration tool to facilitate joint network diagramming.

2. The method of claim 1, further comprising:
   performing, via the at least one processor, a backend server, or a combination thereof, a technical review of the one or more selected telecommunications offerings in view of the service order that is completed based upon the contract package and the one or more forms as authorized,
   wherein the pre-sale procurement data includes value added content, and the value added content includes data for matching the one or more selected telecommunications offerings with needs of a customer, data for qualifying a customer for the one or more selected telecommunications offerings, data for an on-line demonstration of a process for procuring the one or more selected telecommunications offerings, data for answers to technical questions, data for configuring the graphical user interface at the customer device to present one or more tools for matching opportunities to products and qualifying prospects, or a combination thereof.

3. The method of claim 1, wherein the pre-sale procurement data includes recurring order information, and the method further comprising:
   in response to the service order, providing the voice service offering, wherein the voice service offering includes a complete calling package telecommunications offering, a long distance telecommunications offering, a toll free telecommunications offering, a conferencing telecommunications offering, or a calling card telecommunications offering; and
   in response to a user entry, setting the service order as a recurring order according to the recurring order information,
   wherein the pre-sale procurement data includes data for configuring the graphical user interface at the customer device to present a customer-selectable option to set a recurring order.

4. The method of claim 1, further comprising:
   in response to the service order, providing the mobile telecommunications service offering, wherein the data access service offering includes a paging telecommunications offering, a conferencing telecommunications offering, a calling card telecommunications offering, or a dial up telecommunications offering,
   wherein the pre-sale procurement data includes data for configuring the graphical user interface at the customer device to graphically present a purchase online process for the customer to accept the telecommunications offerings.

5. The method of claim 1, further comprising:
   in response to a customer request, received after fulfilling the server order and transmitted via the graphical user interface at the customer device, to open a trouble ticket associated with the service order, opening the trouble ticket; and
   processing the trouble ticket
   wherein the online collaboration tool includes whiteboarding capabilities.

6. The method of claim 5, further comprising:
   in response to the service order, providing the data access service offering, wherein the data access service offering includes a dial up Internet telecommunications offering, or a dedicated Internet telecommunications offering; and
   in response to a customer request, transmitted via the graphical user interface at the customer device, to edit the service order, editing the service order,
   wherein the pre-sale procurement data includes data for the customer application to generate one or more purchase proposals based on the telecommunications offerings and to obtain one or more brochures to support the purchase proposals.

7. A method for servicing telecommunications offerings, comprising:
   receiving, via the at least one processor, a pre-sale inquiry from a customer application, the pre-sale inquiry specifying a search criteria with respect to an order for one of a plurality of telecommunications offerings including voice service, data access service and mobile telecommunications service, that a customer who is not yet a subscriber has initiated, wherein a customer agent assigned for servicing a telecommunications offering order is available via instant messaging with a user of the customer application when the user of the customer application selectively chooses to communicate with the customer agent via instant messaging from a user-selectable option of accessing the customer agent via instant messaging;
   generating, via the at least one processor, pre-sale procurement data in response to the pre-sale inquiry and pertaining to the search criteria, the pre-sale procurement data relating to displaying at a graphical user interface at a customer device via the customer application the one or more selected telecommunications offerings in response to the pre-sale procurement inquiry, wherein the pre-sale procurement data includes data for configuring the graphical user interface to present one or more tools for matching opportunities to products and qualifying prospects; and transmitting, via the at least one processor, the pre-sale procurement data to the customer application, wherein the pre-sale procurement data includes data for the customer application to support an online collaboration tool to facilitate joint network diagramming.

8. The method of claim 7, wherein the pre-sale procurement data includes information for establishing an instant messaging session with the customer agent.

9. A method for procuring telecommunications offerings, comprising:

submitting, via from a customer application residing at one processor, a pre-sale inquiry specifying a selected telecommunications offering from among a voice service offering, a data access offering and a mobile telecommunications offering, the pre-sale inquiry being directed at least to telecommunication services to which a customer who is not yet a subscriber is considering a subscription;

establishing, via the customer application in response to the pre-sale procurement inquiry, an instant messaging session with a customer service personnel; wherein the customer is provided with a customer-selectable option to access a customer service personnel; and receiving, via the at least one processor, pre-sale procurement data including data for configuring a graphical user interface at a customer device to present access to one or more equipment auctions, wherein the pre-sale procurement data is generated in response to the pre-sale inquiry and pertains to the selected telecommunications offering, and wherein the pre-sale procurement data includes data for the customer application to support an online collaboration tool to facilitate joint network diagramming.

10. A system for procuring and servicing telecommunications offerings, comprising:

a customer browser loaded on a customer client computer, the customer browser being configured to submit a procurement inquiry specifying a selected telecommunications offering from among a voice service offering, a data access service offering and a mobile telecommunications offering, the procurement inquiry being directed at least to one or more telecommunication services to which a customer who is not yet a subscriber is considering a subscription, wherein the customer browser is configured to display at a graphical user interface at the customer client computer one or more selected telecommunications offerings in response to the pre-sale procurement inquiry, a contract package, and one or more forms requiring customer authorization to complete a service order of one or more of the selected telecommunications offerings;

a back office browser loaded on a back office client computer, the back office browser being configured to submit a service inquiry specifying a search criteria with respect to an order for a telecommunications offering, the service inquiry being directed at least to the status of the order of the telecommunication service which a customer who is not yet a subscriber has initiated, wherein a customer agent assigned for servicing a telecommunications offering order is available via instant messaging with the customer client computer, and the instant messaging is established upon selection, by the customer client computer, of access to the customer agent via instant messaging from a customer client computer-selectable option to access the customer agent; and a server program loaded on a server computer and being configured to receive the procurement and service inquiries, generate pre-sale procurement data pertaining to the selected telecommunications offering and service data pertaining to the search criteria, and transmit the procurement and service data, wherein the pre-sale procurement data includes data for the customer browser to support an online collaboration tool to facilitate joint network diagramming.

11. The system of claim 10, wherein the customer and back office browsers and the server program communicate according to a communication protocol architecture that includes a web layer and an application layer, the application layer including a presentation layer and a business and integration layer, the web layer being configured to include the server configured as a web server, the presentation layer being configured to receive requests and user actions from the server, the business and integration layer being configured to perform order management, online ordering and user management functions.

12. The system of claim 11, wherein the communication protocol architecture interfaces with a database layer configured to store data used by the system and a service availability tool coupled to the application layer, the service availability tool being configured to provide a service availability function with respect to the selected telecommunications offering.

13. The system of claim 11, further comprising:

a site intelligence server coupled to the web server, the site intelligence server being configured to provide data mining capabilities to gather and report on metrics on the system.

14. The system of claim 10, wherein the voice service offering includes a complete calling package telecommunications offering, a long distance telecommunications offering, a toll free telecommunications offering, a conferencing telecommunications offering, or a calling card telecommunications offering.

15. The system of claim 10, wherein the data access service offering includes a dial up Internet telecommunications offering, or a dedicated Internet telecommunications offering.

16. The system of claim 10, wherein the mobile telecommunications service offering includes a paging telecommunications offering, a conferencing telecommunications offering, a calling card telecommunications offering, or a dial up telecommunications offering.

17. An apparatus for procuring telecommunications offerings, comprising at least one processor configured to:

receive a pre-sale procurement inquiry from a customer application, the pre-sale procurement inquiry specifying one or more selected telecommunications offerings from a plurality of offerings including voice service, data access service and mobile telecommunications service, the pre-sale procurement inquiry being directed at least to one or more telecommunication services to which a customer who is not yet a subscriber is considering a subscription;

provide, in response to the pre-sale procurement inquiry, a customer-selectable option to access a network consultant via instant messaging;

generate pre-sale procurement data relating to displaying at a graphical user interface at a customer device via the customer application the one or more selected telecommunications offerings-responsive to the pre-sale procurement inquiry, wherein the pre-sale procurement data includes data for configuring the graphical user interface to present a contract package and one or more forms requiring customer authorization to complete a service order of one or more of the selected telecommunications offerings; and transmit the procurement data to the customer application, wherein the pre-sale procurement data includes data for the customer application to support an online collaboration tool to facilitate joint network diagramming.

* * * * *